June 21, 1960 R. H. NELSON 2,942,222

RESISTOR

Filed March 26, 1959

*INVENTOR.*
ROBERT H. NELSON

*BY* [signature]
*Attorney*

2,942,222
Patented June 21, 1960

2,942,222

RESISTOR

Robert H. Nelson, Webster, N.Y., assignor to Sage Electronics Corporation, Rochester, N.Y., a corporation of New York Filed Mar. 26, 1959, Ser. No. 802,153
2 Claims. (Cl. 338—243)

The present invention relates to insulated electrical or electronic components, such as resistors, and more particularly to wire-wound resistors.

Electronic or electrical components, such as resistors, give off substantial heat during operation, and this heat must be effectively and properly dissipated to prevent the component from overheating and destroying itself. The efficiency of a resistor, for example, may be measured by the ratio of its actual physical size to the heat which can be safely dissipated therefrom.

It is well known that electrical insulating mediums are relatively poor heat conductors and metal jacketing of electrical or electronic components is frequently done for the purpose of conducting the heat they generate to and through a metal chassis on which electrical or electronic equipment is built. It is generally accepted that a uniform electrical insulating coating of a thickness no greater than is necessary to provide the required dielectric strength will provide the optimum in heat dissipation to a directly encircling metallic jacket or housing.

Heretofore, in the manufacture of such resistors the insulative coating has been applied by a multi-dip or spray process with intermediate polymerizing bakes. The insulating medium used has commonly been a silicone or plastic, filled with various inorganics and brought to proper consistency or viscosity by the addition of a solvent. The wire-wound core coated in this way has been finally "potted" into a metallic housing by "injection-molding" techniques wherein the centering of the coated wire-wound core in the metallic housing is difficult, and which involve the addition of a solventless insulative medium to fill the space between the coated wire-wound core and the metallic housing. This additional layer of insulation between the coated wire-wound core and the metallic housing has hindered the proper transfer or dissipation of heat. Furthermore, because such a coated wire-wound core is difficult to center in its metallic housing with injection-molding techniques, the insulation layers are necessarily unevenly distributed, and this uneven distribution creates "hot spots" in the resistor.

Another assembly, heretofore, in use, comprised a wirewound core, for example, which was either coated or uncoated and which was surrounded by a snugly fitting fabricated or woven insulating sleeve such as fiberglass. This glass fabric was in turn surrounded by a metallic housing. An insulating medium was used to fill the spaces in this woven sleeving, the spaces between the sleeving and the metallic housing, and to fill the space between the wire-wound core and the sleeving. Although this construction provides for more accurate centering of the component in its metallic housing, it is only with the greatest difficulty that such a woven sleeving is uniformly filled with the insulating medium. The solid woven fabric is also prone to buckle and form voids or pockets in its contact with the wire-wound core and the metallic housing. Furthermore, the use of such a fabric sleeving always projects the probability of a non-uniform layer of insulation. The buckling of the sleeve, the voids formed in the insulating fill, and the non-uniformity of the insulation, all hinder the proper dissipation of the heat. Furthermore, the voids in the insulating fill are extremely hazardous to the dielectric strength of the insulation.

The purpose of the present invention is to overcome the shortcomings and disadvantages of prior insulated electronic or electrical components.

In view of the above, one of the objects of this invention is to provide an improved insulated electrical component which is capable of withstanding large electrical loads and high temperatures without danger of damage or excessive heating.

Another object of this invention is to provide an electrical or electronic component which will permit the dissipation of heat uniformly and efficiently.

Another object of this invention is to provide an improved electrical or electronic component wherein the metallic housing is in direct and intimate physical contact with the peripheral surface of the insulating coating of the component over the whole of that surface.

A further object of this invention is to provide an improved electronic or electrical component, the construction of which permits the insulating covering to be of minimum thickness.

A further object of this invention is to provide an improved electrical or electronic component which is much smaller in size than conventional components of equal capacity.

A further object of this invention is to provide an efficient and durable component assembly which is practical and economical to manufacture and serves to dissipate a considerable amount of heat through a metallic shell without the parts becoming excessively heated or causing a decrease in the efficiency of the component.

A further object of this invention is to provide an electrical or electronic component which can be mounted on a chassis in such a manner that the heat dissipated through the metallic shell of the component will be conducted and be further dissipated through contact with the metal chassis which is adjacent the shell.

Other objects of this invention will be apparent hereinafter from the drawing, the specification, and from the recital of the appended claims.

Figure 1:
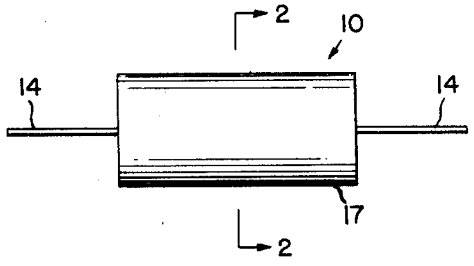
Fig. 1 is a plan view showing a resistor made according to one embodiment of this invention.
Figure 4:
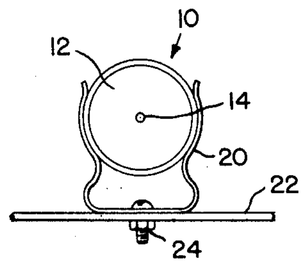
Fig. 4 is an end view of the resistor shown in Fig. 1 illustrating one way for mounting the resistor to a chassis.
Figure 2:
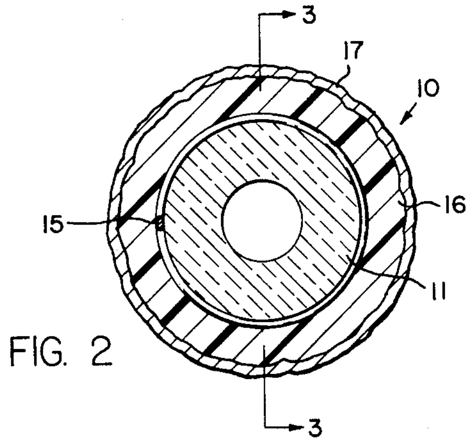
Fig. 2 is an enlarged sectional view of this resistor taken on line 2—2 of Fig. 1.
Figure 3:
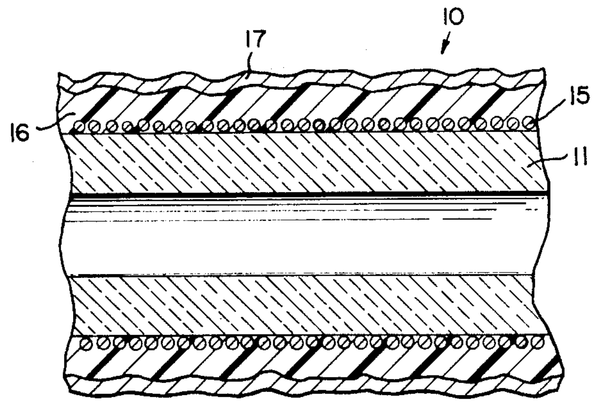
Fig. 3 is a fragmentary longitudinal sectional view taken on line 3—3 of Fig. 2.

Referring now to the drawing by numerals of reference, the resistor, generally denoted at 10, comprises a hollow ceramic cylindrical core 11, the ends of which are closed by metal conducting caps 12, only one of which is shown in Fig. 1. Each of these caps has a conducting wire 14 soldered or otherwise secured centrally therein to project from the end of the resistor. Wire 15 of the desired diameter and of the required number of turns is wound on the core 11 on a conventional winding machine and secured at opposite ends to the respective caps 12. One manner of securing the end caps to the core and of securing the wire 15 to the end caps is disclosed in Patent No. 2,640,132, granted May 26, 1953, and reference may be made to that patent for a more detailed description thereof.

The resistor coil 15 and the ceramic body 11 are coated with an insulating and sealing material 16, which is baked thereon. This sealing material, which may be of any suitable type, such as a silicone varnish, or other plastic, completely covers and seals the wire winding 15 and also the conducting caps 14 around the core 11. This insulation is just thick enough so that it provides the required dielectric strength to the resistor.

Surrounding the baked insulation, is a thin metallic sleeve or shell 17 made for instance, of aluminum. The interior of this sleeve or shell is made to conform to the coating; and because it is impossible by spraying or dipping to apply the silicone or other coating in such a way that its outside surface will be absolutely smooth, the sleeve or shell, in the illustrated embodiment of the invention, is irregularly formed so that its inside wall is in complete contact with the irregular peripheral surface of the insulating coating.

One method of obtaining the desired overall intimate contact between the metallic sleeve or jacket and the coated wire-wound unit is described in my copending application Serial No. 802,154, filed March 26, 1959. This method is to insert the jacketed component into a cylindrical nylon or other plastic sleeve which has an original inside diameter adequate to receive the jacketed component snugly. The nylon or other plastic sleeve is then squeezed down on the metallic shell to cause the shell to conform to the contour of the insulating covering and to contact each and every part of its irregular peripheral surface. This simultaneously physically densifies the metallic shell. This is done without damage to the insulation and entirely independent of its symmetry.

The resistor made according to this invention may be mounted on a chassis by its wires 14, or may be mounted on a chassis by securing it within a spring-like clamp 20 which is attached to the metallic chassis 22 by a nut and bolt 24. With the resistor secured in this latter manner, the heat, which is dissipated to all surfaces of the metallic shell, is further conducted away through the metallic bracket and the chassis. The metallic shell may also be brazed to or integrally formed with its supporting bracket.

The drawing herein exaggerates the uneven contour of the peripheral surface of the thin coating of insulation in order to more adequately illustrate the configuration of the assembly. The irregularities of the surface are measured, however, in thousandths, possibly even ten-thousandths, of an inch.

It is apparent that I have provided an improved construction for an electrical or electronic component which is provided with an insulating covering of a minimum thickness, and which has a metallic covering or shell that is in direct physical contact with the irregular surface of the insulating coating.

Furthermore, I have provided an improved electrical or electronic component wherein the physical size and weight of the heat generating component is materially reduced over conventional components of equal capacity.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A wire wound resistor comprising an insulating core, a plurality of turns of bare wire wound on said core, an electrical insulating coating in the form of a body of plastic material covering said turns of wire and said core and being in intimate contact with all of them, and a thin metallic shell covering said coating and in intimate contact therewith, the inner surface of said shell having irregularities to conform to any outside surface irregularities of said coating, and the outer surface of said shell having corresponding surface irregularities, said shell being of uniform thickness throughout.

2. A wire wound resistor comprising an insulating core, a pair of metal caps mounted on opposite ends of said core and having electrical conducting wires extending centrally therefrom, a plurality of turns of bare wire wound on said core and connected at opposite ends to said caps, an electrical insulating coating in the form of a body of plastic material covering said turns of wire and being in intimate contact with all of them, and a thin metallic shell covering said coating and in intimate contact therewith over the whole of the outside surface of said coating, the inner surface of said shell having irregularities to conform to any outside surface irregularities of said coating, and the outer surface of said shell having corresponding surface irregularities, said shell being of uniform thickness throughout.

References Cited in the file of this patent

UNITED STATES PATENTS 2,213,969 Ruben ---------------- Sept. 10, 1940